(12) United States Patent
Yoakum (10) Patent No.: US 7,257,218 B2
(45) Date of Patent: Aug. 14, 2007

(54) PRESENCE ENABLED QUEUE MANAGEMENT

(75) Inventor: John H. Yoakum, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/331,706

(22) Filed: Dec. 30, 2002

(65) Prior Publication Data

US 2004/0125941 A1 Jul. 1, 2004

(51) Int. Cl.
*H04M 3/00* (2006.01)
(52) U.S. Cl. .......................... 379/265.01; 379/265.02; 379/265.12; 379/266.01; 379/266.09; 379/266.1; 379/309
(58) Field of Classification Search .............................. 379/265.01–266.1, 309
See application file for complete search history.

(56) References Cited

U.S. PATENT DOCUMENTS

| | | | | |
|---|---|---|---|---|
| 4,932,050 A | 6/1990 | Davidson et al. | ........... | 379/211 |
| 5,315,636 A | 5/1994 | Patel | ........................... | 379/58 |
| 5,414,759 A | 5/1995 | Ishikuri et al. | ............... | 379/88 |
| 5,450,613 A | 9/1995 | Takahara et al. | ........... | 455/54.1 |
| 5,550,907 A | 8/1996 | Carlsen | ...................... | 379/207 |
| 5,555,376 A | 9/1996 | Theimer et al. | ....... | 395/200.09 |
| 5,596,633 A | 1/1997 | Meier et al. | ................. | 379/201 |
| 5,633,921 A | 5/1997 | Soderberg | ................... | 379/207 |
| 5,633,924 A * | 5/1997 | Kaish et al. | ........... | 379/266.03 |
| 5,742,905 A | 4/1998 | Pepe et al. | ................... | 455/461 |
| 5,757,901 A | 5/1998 | Hiroshige | ................... | 379/212 |
| 5,771,280 A | 6/1998 | Johnson | ................... | 379/93.23 |
| 5,790,649 A | 8/1998 | Hiroshige | ................... | 379/201 |
| 5,812,865 A | 9/1998 | Theimer et al. | ............ | 395/800 |
| 5,815,554 A | 9/1998 | Burgess et al. | .......... | 379/90.01 |
| 5,825,864 A | 10/1998 | McGraw et al. | ............ | 379/210 |
| 5,930,702 A | 7/1999 | Goldman et al. | ........... | 455/417 |
| 6,058,415 A | 5/2000 | Polcyn | ....................... | 709/200 |
| 6,067,357 A * | 5/2000 | Kishinsky et al. | ..... | 379/265.02 |
| 6,104,913 A * | 8/2000 | McAllister | ................. | 455/41.1 |
| 6,125,176 A | 9/2000 | Foladare et al. | ............ | 379/211 |
| 6,134,314 A | 10/2000 | Dougherty et al. | ......... | 379/207 |

(Continued)

FOREIGN PATENT DOCUMENTS

EP 1071295 A2 1/2001

(Continued)

OTHER PUBLICATIONS

International Search Report for related application PCT/US02/40882, mailed Oct. 8, 2003.

(Continued)

*Primary Examiner*—Quynh H. Nguyen
(74) *Attorney, Agent, or Firm*—Withrow & Terranova, PLLC (57) ABSTRACT

The present invention allows a queue management system (QMS) to use presence information from a presence system to efficiently match requestors of information with qualified resources capable of providing the necessary response. The resources for information may be humans or automated systems, which may be configured to facilitate communications with the requestors using different types of communication technologies. Further, these resources may be associated with different skill sets, experience, or areas of expertise. Thus, the resources may provide different roles, and any given resource may provide multiple roles, in addition to facilitating communications using different mediums.

22 Claims, 6 Drawing Sheets

U.S. PATENT DOCUMENTS

| | | | |
|---|---|---|---|
| 6,141,356 A | 10/2000 | Gorman | 370/493 |
| 6,144,644 A | 11/2000 | Bajzath et al. | 370/259 |
| 6,148,328 A | 11/2000 | Cuomo et al. | 709/204 |
| 6,175,616 B1 | 1/2001 | Light et al. | 379/88.14 |
| 6,185,292 B1 | 2/2001 | Miloslavsky | 379/265 |
| 6,223,165 B1 | 4/2001 | Lauffer | 705/8 |
| 6,243,398 B1 | 6/2001 | Kahane et al. | 370/522 |
| 6,295,348 B1 | 9/2001 | Bleile et al. | 379/199 |
| 6,301,609 B1 | 10/2001 | Aravamudan et al. | 709/207 |
| 6,377,944 B1 * | 4/2002 | Busey et al. | 707/3 |
| 6,389,127 B1 | 5/2002 | Vardi et al. | 379/209.01 |
| 6,418,198 B2 | 7/2002 | Brablec et al. | 379/79 |
| 6,430,289 B1 | 8/2002 | Liffick | 379/900 |
| 6,449,344 B1 | 9/2002 | Goldfinger et al. | 379/88.17 |
| 6,463,142 B1 | 10/2002 | Kilp | 379/201.06 |
| 6,463,471 B1 | 10/2002 | Dreke et al. | 709/224 |
| 6,480,593 B1 | 11/2002 | Munday et al. | 379/211.02 |
| 6,483,900 B1 | 11/2002 | Light et al. | 379/88.17 |
| 6,546,096 B1 | 4/2003 | Meiden et al. | 379/209.01 |
| 6,584,494 B1 | 6/2003 | Manabe et al. | 709/204 |
| 6,658,095 B1 | 12/2003 | Yoakum et al. | 379/93.01 |
| 6,665,395 B1 * | 12/2003 | Busey et al. | 379/265.09 |
| 6,700,966 B2 | 3/2004 | Takagi et al. | 379/201.06 |
| 2001/0005412 A1 | 6/2001 | Light et al. | 379/88.13 |
| 2001/0044299 A1 | 11/2001 | Sandegren | 455/422 |
| 2001/0053213 A1 | 12/2001 | Truong et al. | 379/202.01 |
| 2001/0053214 A1 | 12/2001 | Kleinoder et al. | 379/207.04 |
| 2002/0024947 A1 | 2/2002 | Luzzatti et al. | 370/352 |
| 2002/0035605 A1 | 3/2002 | McDowell et al. | 709/206 |
| 2002/0038360 A1 | 3/2002 | Andrews et al. | 709/223 |
| 2002/0055975 A1 | 5/2002 | Petrovykh | 709/205 |
| 2002/0059622 A1 | 5/2002 | Grove et al. | 725/91 |
| 2002/0060988 A1 | 5/2002 | Shtivelman | 370/259 |
| 2002/0065894 A1 | 5/2002 | Dalal et al. | 709/206 |
| 2002/0076010 A1 | 6/2002 | Sahai | 379/88.19 |
| 2002/0114432 A1 | 8/2002 | Shaffer et al. | 379/90.01 |
| 2002/0116336 A1 | 8/2002 | Diacakis et al. | 705/51 |
| 2002/0116461 A1 | 8/2002 | Diacakis et al. | 709/204 |
| 2002/0120687 A1 | 8/2002 | Diacakis et al. | 709/204 |
| 2002/0126701 A1 | 9/2002 | Requena | 370/469 |
| 2002/0143876 A1 | 10/2002 | Boyer et al. | 709/205 |
| 2002/0143877 A1 | 10/2002 | Hackbarth et al. | 709/205 |
| 2002/0147777 A1 | 10/2002 | Hackbarth et al. | 709/205 |
| 2002/0163572 A1 | 11/2002 | Center, Jr. et al. | 348/14.08 |
| 2002/0181693 A1 * | 12/2002 | Ribera | 379/265.09 |
| 2003/0018704 A1 | 1/2003 | Polychronidis et al. | 709/202 |
| 2003/0023681 A1 | 1/2003 | Brown et al. | 709/204 |
| 2003/0052915 A1 | 3/2003 | Brown et al. | 345/752 |
| 2003/0055897 A1 | 3/2003 | Brown et al. | 709/205 |
| 2003/0059029 A1 * | 3/2003 | Mengshoel et al. | 379/265.02 |
| 2003/0065788 A1 | 4/2003 | Salomaki | 709/227 |
| 2003/0073440 A1 | 4/2003 | Mukherjee et al. | 455/435 |
| 2003/0105820 A1 | 6/2003 | Haims et al. | 709/205 |
| 2003/0129972 A1 | 7/2003 | Tosaki et al. | 455/414 |
| 2003/0135624 A1 | 7/2003 | McKinnon et al. | 709/228 |
| 2003/0154293 A1 | 8/2003 | Zmolek | 709/228 |
| 2004/0037271 A1 | 2/2004 | Liscano et al. | 370/352 |
| 2004/0044647 A1 | 3/2004 | Salmenkaita | 707/1 |
| 2004/0174966 A1 | 9/2004 | Koch | 379/88.22 |
| 2004/0249776 A1 | 12/2004 | Horviz et al. | 706/21 |

FOREIGN PATENT DOCUMENTS

| | | |
|---|---|---|
| EP | 1 148 688 A1 | 10/2001 |
| WO | 99/17194 | 4/1999 |
| WO | WO99/34628 | 7/1999 |

OTHER PUBLICATIONS

Day, M. et al., "A Model for Presence and Instant Messaging," IETF REquest for Comments, XX, XX, No. 2778, Feb. 2000, pp. 1-17.

Rosenberg, J. et al., "SIP for Presence," IETF Internet Draft, Nov. 13, 1998, XP002173451.

Shim, Hyong Sop et al., "An Example of Using Presence and Availability in an Enterprise for Spontaneous, Multiparty, Multimedia Communications," IPTEL 2001, Apr. 3, 2001, XP002252324.

International Search Report for PCT/IB03/06073, mailed May 4, 2004.

Eschenburg, Axel, "Wo Laufen Sie Denn? ICQ Haelt Verbindung Zu Bekannten," CT Magazin Fuer Computer Technik, Verlag Heinz Heise GMBH, Hannover, Germany, No. 22, Oct. 26, 1998, pp. 92-95, Translation Provided.

Kohda et al., "IMPP: A New Instant Messaging Standard and Its Impact on Internet Business," Fujitsu-Scientific and Technical Journal, Fujitsu Limited, Kawasaki, Japan, vol. 36, No. 2, Dec. 2000, pp. 147-153.

Brodsky, Alexander et al., "Resource Management in Agent-based Distributed Environments," Proceedings of the 1999 International Symposium on Kyoto, Japan Nov. 28-30, 1999, pp. 95-108, XP010379697.

Chapin, Steve J. et al., "Resource Management in Legion," Future Generations Computer Systems, Elsevier Science Publishers, Amsterdam, Netherlands, vol. 15, No. 5-6, Oct. 1999, pp. 583-594, XP004176748.

Krauter, Klaus, et al., "A Taxonomy and Survey of Grid Resource Management Systems for Distributed Computing," Software Practice & Experience, John Wiley & Sons Ltd., Chichester, Great Britain, vol. 32, No. 2, Feb. 2, 2002, pp. 135-164, XP001091827.

International Search Report for PCT/IB03/05780 mailed Jan. 27, 2005.

* cited by examiner

PRESENCE ENABLED QUEUE MANAGEMENT

FIELD OF THE INVENTION

The present invention relates to providing presence information, and in particular to controlling allocation of resources in a queue management system based on the presence information.

BACKGROUND OF THE INVENTION

People often need to interact with resources that are able to respond to specific inquiries. The resources may be other people or automated systems capable of providing the necessary response. A few common scenarios where people assist incoming callers include customer service and ordering systems, as well as information and directory assistance systems. These systems may be fully or partially automated by replacing human resources with automated systems. Those skilled in the art will recognize various other types of attended and unattended systems, which provide information to requestors in response to various types of requests.

In these systems, the number of resources are limited and requestors of the resources are often placed in a queue until a resource becomes available. A queue management system (QMS) will monitor incoming requests and assign resources to requestors based on defined priority criteria.

Given the increasing number of situations where information resources are needed, as well as the wide acceptance of email and other data-based communications in addition to voice communications, the providers of resources can often communicate with the requestors via different communication technologies. For example, requestors may simply call in to an information retrieval system wherein a human or automated response system will ultimately be assigned to the requestor. Upon being assigned, the human or automated system will respond to some form of request by the requestor. Alternatively, the requestor may send an email requesting information, wherein the email is placed in a queue and ultimately assigned to either a human or automated system to generate a response to the email. The response may simply be another email sent to the requestor, or an initiated call to the requestor. Those skilled in the art will recognize various types of communications media such as instant messages, text based chat, and others, which can be utilized to communicate with the requestor.

Additionally, the available resources may be associated with different skill sets, experience, and areas of expertise, in addition to being able to communicate via different mediums. Unfortunately, existing queue management systems have difficulty handling different types of resources, let alone using different communication technologies to respond to requests. The combination of different types of resources and different communication abilities increases the difficulty in determining whether a resource is available. For example, typical call-based QMS systems will monitor whether a resource provider's telephone is on or off hook. If the telephone is on hook, the resource provider is assumed available. If multiple communication capabilities are supported by a given resource provider, the provider may be busy responding to an email, and as such, the status of the telephone does not bear on the availability of the resource.

Further, there is a desire to move away from central, dedicated QMS systems to more diverse and geographically dispersed architectures capable of supporting different types of resources as well as different techniques for interacting with requestors. Accordingly, there is a need for a way to determine the availability of resources having different skill sets, experience, and areas of expertise, and that may be geographically dispersed and capable of interacting with a requestor using different communication technologies.

SUMMARY OF THE INVENTION

The present invention allows a queue management system (QMS) to use presence information from a presence system to efficiently match requestors of information with qualified resources capable of providing the necessary response. The resources for information may be humans or automated systems, which may be configured to facilitate communications with the requestors using different types of communication technologies. Further, these resources may be associated with different skill sets, experience, or areas of expertise. Thus, the resources may provide different roles, and any given resource may provide multiple roles, in addition to facilitating communications using different mediums.

Devices associated with human resources or automated resource devices are configured to provide state information to a presence system, which will process the state information and provide presence information bearing on the availability of a resource to provide a given role. The queue management system will use the presence information to assign available resources to respond to incoming requests. The presence information may include not only the availability of the resource to provide a given role, but the available communication capabilities of the resource for the given role at any given time.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a queue management system (QMS) to use presence information from a presence system to efficiently match requestors of information with qualified resources capable of providing the necessary response. The resources for information may be humans or automated systems, which may be configured to facilitate communications with the requestors using different types of communication technologies. Further, these resources may be associated with different skill sets, experience, or areas of expertise. Thus, the resources may provide different roles, and any given resource may provide multiple roles, in addition to facilitating communications using different mediums.

Devices associated with human resources or automated resource devices are configured to provide state information to a presence system, which will process the state information and provide presence information bearing on the availability of a resource to provide a given role. The queue management system will use the presence information to assign available resources to respond to incoming requests. The presence information may include not only the availability of the resource to provide a given role, but the available communication capabilities of the resource for the given role at any given time. The use of presence information provides a flexible way for the queue management system to determine the availability of resources, and as described below, the presence information may be configured to provide a more accurate view of the availability of a given resource than previously available.

The presence system is capable of monitoring state information derived from a plurality of sources over any number of disparate networks. Preferably, the sources of state information are the automated resources or the devices associated with human resources. The devices used by human resources may be those frequently used by the human resource throughout a normal day and configured to provide state information to the presence system. These devices monitor normal human interactions and automatically provide corresponding state information to the presence system without requiring the person to specifically enter or otherwise provide information bearing on status or availability. The automated devices can provide state information in an automated fashion. The following outlines the operation of a presence-based queue management system as well as numerous sources of state information, along with the provisioning and operation of a presence system.

Figure 1:
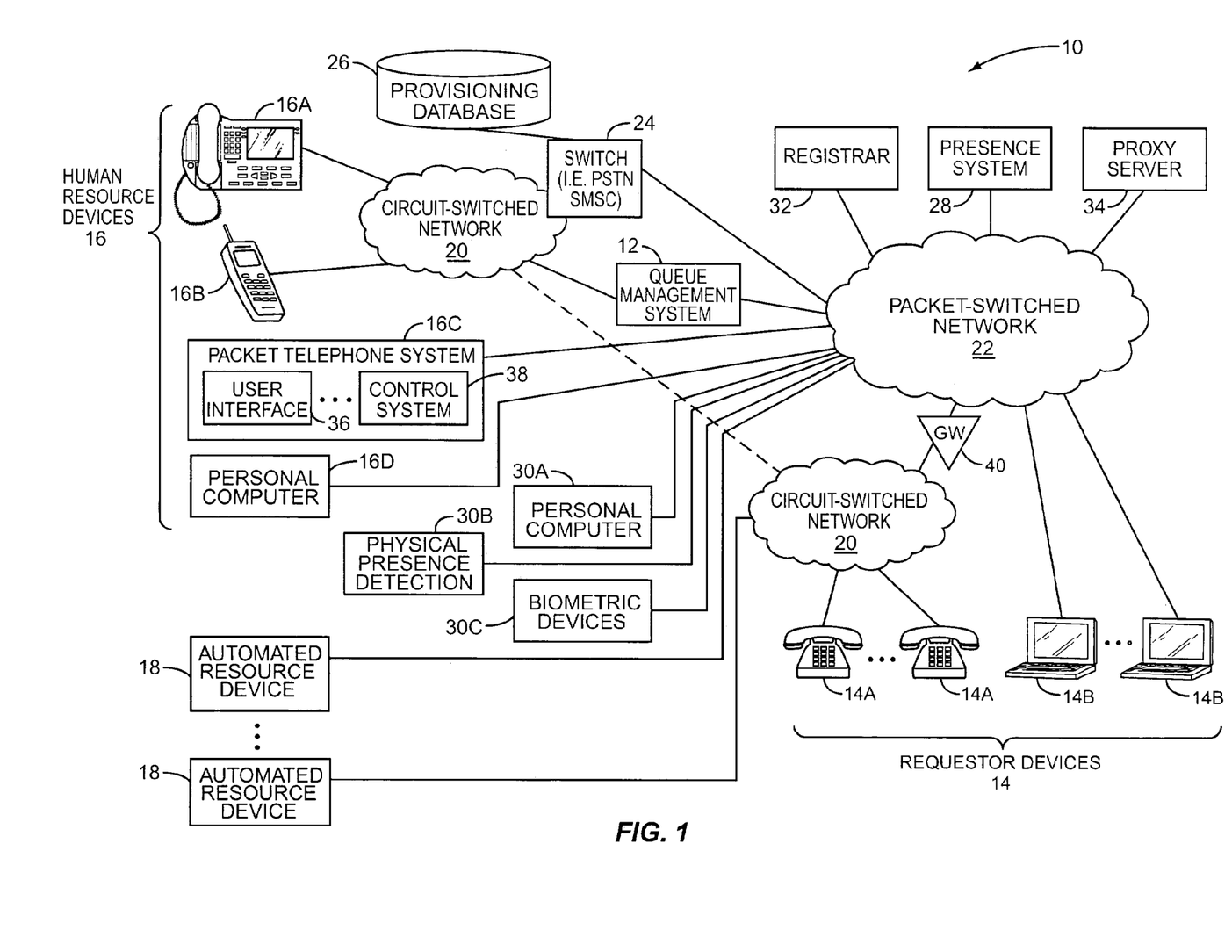
FIG. 1 is a block representation of a communication environment constructed according to one embodiment of the present invention.

With reference to FIG. 1, a communication environment 10 including a queue management system 12 and capable of generating presence information for a plurality of resources is illustrated. In general, the queue management system 12 will receive requests for resources from requestors via requestor devices 14 and assign resources, human or automated, to respond to the requests. Human resources are made available through human resource devices 16, such as a landline telephone 16A, mobile telephone 16B, packet telephone system 16C, and personal computer 16D. The landline and wireless telephones 16A, 16B, and packet telephone system 16C may facilitate voice-based responses to requests initiated via a telephone call. The personal computer 16D may provide responses via data-based communications, such as email and instant messaging, as well as voice-based communications, if so equipped. The automated resources are provided by automated resource devices 18, which are essentially computer-based systems configured to respond to data- or voice-based requests in an automated fashion, illustrative examples of which include web-based information retrieval systems or directory assistance systems, respectively. Those skilled in the art will recognize various other types of automated resources which can respond to requestors in response to various types of requests. Similarly, those skilled in the art will recognize that other requestor devices with substantially similar input capabilities are equally viable and considered within the scope of this invention.

The communication environment 10 may include a circuit-switched network 20, such as the public switched telephone network (PSTN) or a cellular communication network, and a packet-switched network 22, such as the Internet, which supports packet-switched communications. The circuit-switched network 20 may include various types of switches 24 to facilitate circuit-switched communications for landline or wireless communications. The circuit-switched network 20 supports communications with various types of telephony devices, such as the traditional landline telephone 16A or mobile telephone 16B. In a wireless communication embodiment, the switches 24 cooperate with base stations (not shown), which facilitate wireless communications with mobile terminals, such as the mobile telephone 16B. Those skilled in the art will recognize the functionality of the switches 24 and other components of the circuit-switched network 20 to facilitate communications with the landline and wireless telephony devices 16A, 16B.

The switch 24 is defined as being either an integrated device or multi-component system facilitating circuit-switched communication and including call server or call control functionality, which is traditionally provided in intelligent networks (IN), such as those implementing Signaling Systems 7 (SS7). Typically, the switches 24 cooperate with a provisioning database 26, which provides information allowing a switch 24 to properly identify, locate, and provision the various telephony devices associated with the circuit-switched network 20.

The present invention is capable of automatically delivering state information, which is derived from user interaction with any number of sources, to a presence system 28 located on the packet-switched network 22. For example, the switch 24 may be configured to provide the state of the telephones 16A or 16B, their location, or a combination thereof, directly or indirectly to the presence system 28.

The presence system 28 may be configured by a user device, such as a personal computer, and operates to collect state information from the human resource devices 16, automated resource devices 18, and any available auxiliary state devices 30, such as a personal computer 30A, physical presence detection system 30B, or biometric device 30C associated with the human resource device 18. The state information from the auxiliary state devices 30 may be used to supplement the state information provided by the human resource devices 16 to provide a better determination of availability for the actual human resource 16. The presence system 28 will process the state information from the various devices to derive presence information, and provide the presence information to the queue management system 12, automatically or in response to a request. Preferably, the queue management system 12 subscribes to the presence system 28 and identifies the resource devices (human and/or automated) whose presence information is desired. The presence system 28 will accept these subscriptions as well as register the participating resource devices.

A registrar 32 may be provided on the packet-switched network 22 to maintain a relationship between the logical and the physical addresses of devices that directly or indirectly communicate with the presence system 28. Such registration is typically required only when there is a change between the logical or user addresses and the physical addresses of a given device.

In one embodiment, the switch 24 is configured to provide state information corresponding to the status, mode, state, location, or a combination thereof associated with a human resource device 16 to the presence system 28. In this embodiment, it is preferable to provide a proxy server 34 to act as a liaison between the switch 24 and the presence system 28. As such, the switch 24 will provide presence information to the proxy server 34, which will represent the switch 24 to the presence system 28 in traditional proxy fashion. Those skilled in the art will recognize that the proxy server 34 is optional and may prove beneficial with certain communication protocols.

The presence information provided to the presence system 28 from the switch 24 will depend on the resource and the type of communication environment. For example, the traditional landline telephone 16A will not change location, typically providing location information only as a part of registration, and dynamically provide a mechanism to determine state information relating to its operation. The switch 24 that serves the landline telephone 16A can determine whether the phone is on hook or off hook, and thus determine whether the user is engaged in a telephone call. More sophisticated systems may be able to determine whether the party is on a personal call or a business call and whether any settings on the phone indicate that the user is in or out of the office. Accordingly, the state information gathered by the switch 24 in association with the operation of the landline telephone 16A is used to create presence information to send to the presence system 28 via the proxy server 34.

For mobile terminals, such as the mobile telephone 16B, the servicing mobility switching center (SMSC), which is represented by the switch 24, may gather all of the state information described above, as well as provide dynamic location information derived directly from the mobile terminal 16B or from the circuit-switched network 20. Accordingly, the state information for mobile devices may be supplemented with location information, which provides the presence system 28 the opportunity to distribute presence information to the queue management system 12 based on dynamic location, if so desired. The location information may be provided by the mobile terminal 16B, if equipped with location detection technology, such as that provided by the Global Positioning System (GPS). As such, the mobile terminal 16B receives the GPS coordinates and may either provide the coordinates to the switch 24, which will determine the mobile terminal's location, or may process the GPS information to determine a location, which is then sent to the switch 24. Alternatively, triangulation techniques may be used to determine the mobile terminal's location, and the location may then be stored in a location database or like device. The location database may be accessed via the switch 24 to obtain location information, or the location database may be configured such that the presence system 28 or an associated device may directly access it via the packet-switched network 22.

Packet-based telephony devices, such as the packet telephone system 16C, essentially emulate the operation of circuit-switched telephony devices entirely over the packet-switched network 12. Thus, state information associated with a fixed or mobile packet telephone system 16C may be configured to automatically provide state information, and perhaps location information, to the presence system 28 directly or indirectly via the proxy server 34. The packet telephone system 16C will include a user interface 36 and a control system 38. As those skilled in the art will recognize, the packet telephone system 16C may be integrated into a single device, or may be implemented in multiple devices in a client-server configuration. For the latter case, the proxy server 34 may be further configured to support various operational features of the packet telephone system 16C.

The user interface 36 may include a microphone and speaker to facilitate voice communications, as well as various keypads and displays to allow user interaction in traditional fashion. The control system 38 will operate to support the user interface 36 and provide the requisite functionality to enable the packet telephone system 16C to facilitate communications with other devices on the packet-switched network 12 directly or indirectly via the proxy server 34. For the purposes of description, assume that the control system 38 is capable of gathering and providing state information for the packet telephone system 16C. In wireless environments, a wireless packet-switched network (not shown) is necessary to facilitate communications with the packet-switched network 22.

Figure 2:
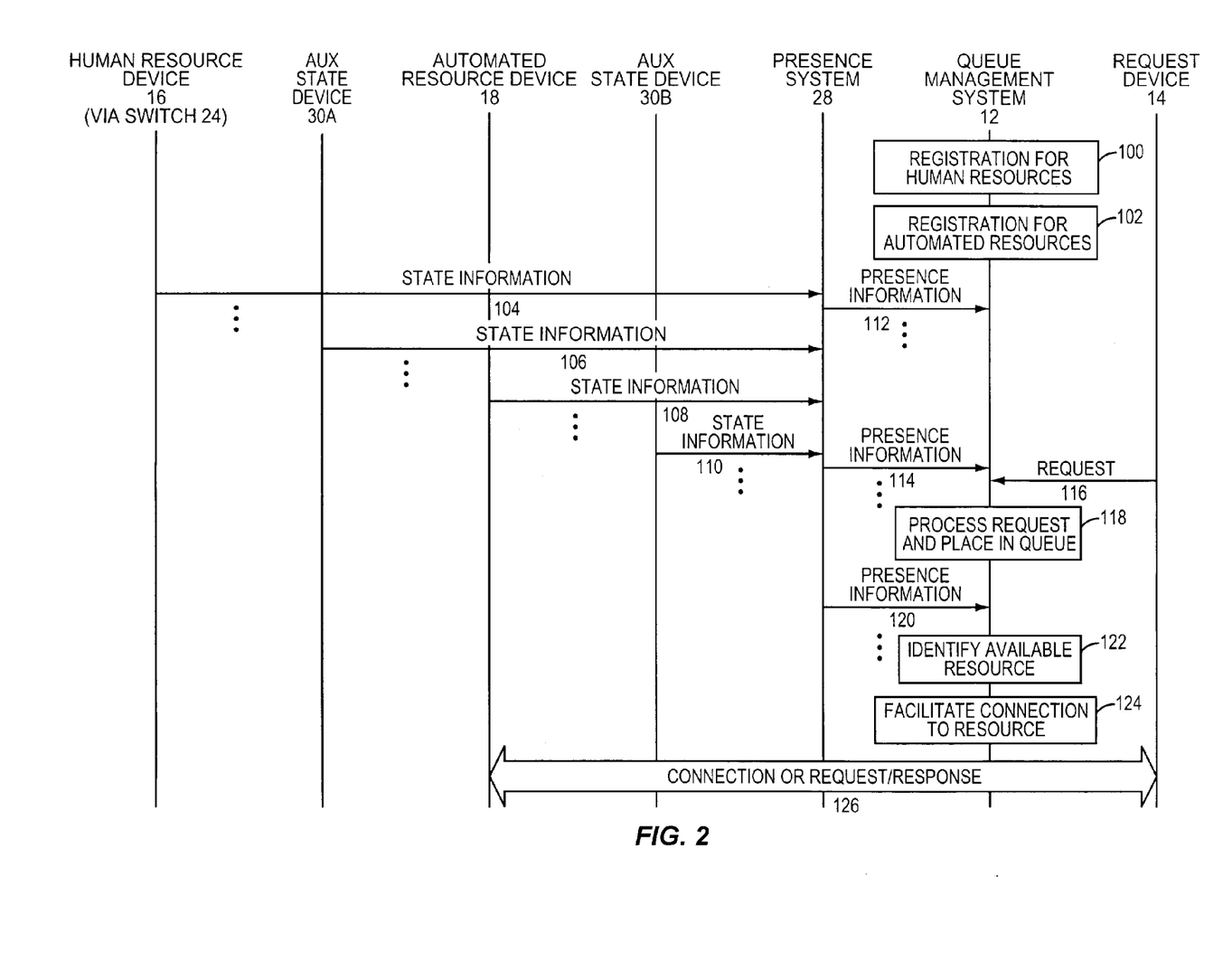
FIG. 2 is a call flow diagram according to one embodiment of the present invention.

Turning now to FIG. 2, a call flow diagram is provided to illustrate an exemplary embodiment according to one aspect of the present invention. Notably, each resource, be it a human or automated resource, may fulfill one or more roles, wherein each role corresponds to a particular type of resource. Thus, a human or automated resource is capable of taking on multiple roles to provide different types of resources. Additionally, a given role may be associated with one or more communication methods, such that one role may be fulfilled using one or more communication techniques while another role may be fulfilled using a different communication technique. Both human and automated resources may respond, if desired, using different communication techniques. As an example, a single person may provide a first role providing operator assistance using one or more voice-based communication technologies, and a second role as a customer service representative capable of responding to voice or email requests. As such, each human resource device 16 and automated resource device 18 can fulfill various roles, which are related to a given resource and media capability.

Assume that the exemplary environment has a human resource who will interact with a human resource device 16, such as the landline telephone 16A or the mobile telephone 16B, which are monitored by the switch 24 providing state information pertaining to the state of the human resource device 16 to the presence system 28. Also assume that two auxiliary state devices 30, such as the personal computer 30A and the physical presence detection system 30B, are associated to provide additional state information pertaining to the person associated with the human resource device 16. Lastly, an automated resource device 18 is also provided.

Initially, the human and automated resources register their respective identities, the specific roles in which they can provide resources, and media capabilities with the queue management system 12 (steps 100 and 102). Next, but not illustrated, the human resource device 16, automated resource device 18, and auxiliary state devices 30A and 30B will register with the associated presence system 28 and configure themselves to provide state information to the presence system 28 in a periodic fashion or as the states change. As such, each of these devices will provide state information to the presence system 28 (steps 104 through 110). In the meantime, the presence system 28 will monitor the state information from the various devices and provide presence information based on the state information for a given role to the queue management system 12 (steps 112 and 114).

The queue management system 12 will receive a request for resources from a requestor device 14 (step 116), process the request, and place the requestor in a queue, which dictates the order in which the request will be serviced (step 118). Presence information will continue to be provided to the queue management system 12 from the presence system 28 (step 120). The queue management system 12 will monitor available resources and identify an available resource for the request in the queue having the highest priority for the available resource (step 122).

Typically, the queue management system 12 will take the necessary steps to facilitate a connection between the requestor device 14 associated with the request and the selected resource device, the automated resource device 18 (step 124). If a voice-based connection is required, the call initiating the request is connected to the automated resource 18. If a data-based resource is requested, the request may simply be sent to the automated resource device 18, which can reply to it in a timely fashion. For example, an incoming request may arrive via email, wherein the email is forwarded to the automated resource device 18, which is capable of responding to the email in many different ways, including email or an automated telephone response. In essence, once the resource device is selected, the connection between it and the requestor device 14 is established or the request is forwarded to the appropriate device for reply (step 126).

Accordingly, the invention provides a mechanism where human or automated resources can register as being capable of providing specific roles as well as interacting via specific types of media. Their availability for communications in any of these roles is provided via presence information, which is derived from state information provided by the devices with which the human resources interact or the actual state of the automated device. Based on the presence information, the queue management system 12 can readily determine if the resources are available and facilitate a response to the request in traditional fashion. Thus, geographically dispersed resources may take on different roles via different media and be managed by the queue management system 12 in an effective manner. In addition to registering different roles, various authority levels may be established in association with any given role. The authority levels may be used by the queue management system 12 to determine how to assign resources to request. The queue management system 12 may use various filtering techniques and prioritization parameters to control when resources are allocated and what resources are allocated to a given request. Further, the presence information may take into consideration all of the normal queue management parameters in addition to determining how long a state has been maintained in a resource device or how active resources have recently been.

Notably, the requestor devices 14 may take many forms, including traditional landline telephones 14A, which facilitate circuit-switched communications via the circuit-switched network 20. Notably, the calls may be completely circuit-switched connections or may pass through a gateway 40, which converts the circuit-switched communications to packet-switched communications to facilitate voice over packet (VoP) communications over the packet-switched network 22. Thus, the queue management system 12 may handle incoming calls via the circuit-switched network 20 or the packet-switched network 22. Similarly, requestor devices 14, such as personal computers 14B, may be configured to submit voice or data-based requests. Those skilled in the art will recognize various ways for the queue management system 12 to receive requests and to ultimately associate incoming requests with appropriate resources for handling.

Figure 3:
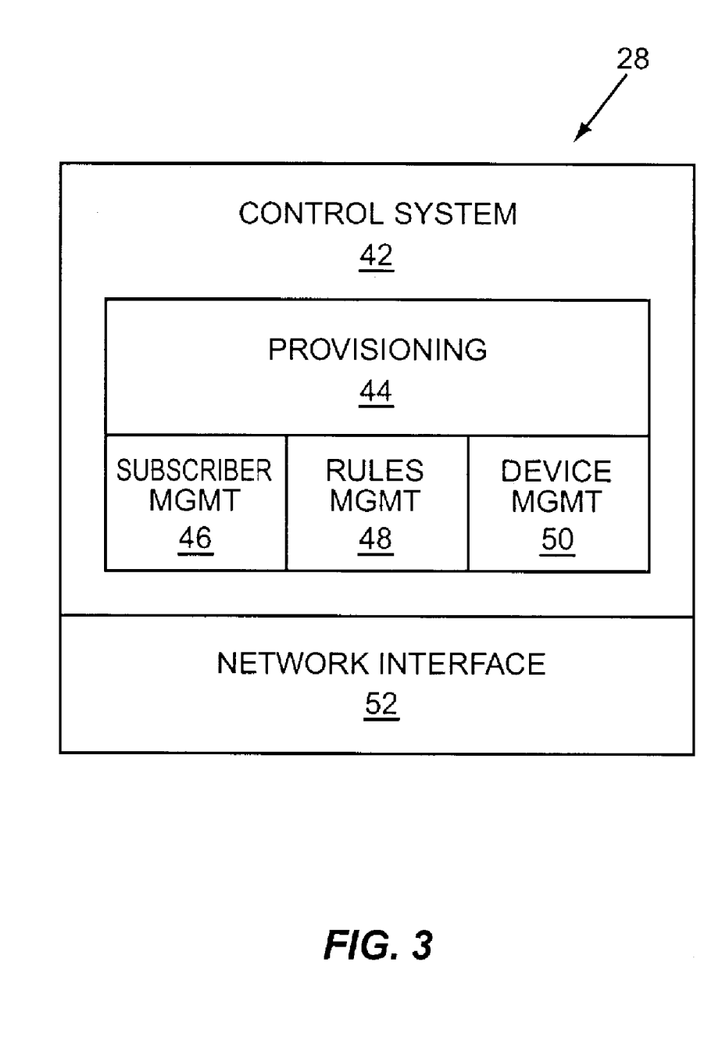
FIG. 3 is a logical representation of a presence system according to one embodiment of the present invention.

The presence system 28 may be implemented in one or more systems. With reference to FIG. 3, a logical breakdown of one embodiment of the presence system is illustrated. The presence system 28 includes a control system 42 adapted to implement provisioning logic 44, subscriber management logic 46, rules management logic 48, and device management logic 50. The device management logic 50 facilitates and controls interaction with the various devices, which are configured to provide state information to the presence system 28 based on user interaction. The subscriber management logic 46 facilitates and controls interaction with the queue management system 12.

Accordingly, the queue management system 12 will subscribe to the presence system 28 to receive presence information via the subscriber management logic 46. Based on the subscription, the presence system 28 will receive state information from the various devices, evaluate the state information to generate the presence information using rules in the rules management logic 48, and deliver the presence information to the subscribing queue management system 12. The device management logic 50 will control interaction with the various devices providing state information. Such control may include configuring the device to provide the state information in a specified manner and format. The provisioning logic 44 facilitates provisioning of the subscriber management logic 46, rules management logic 48, and device management logic 50. Provisioning may include establishing a profile for the user providing presence information. The profile will typically identify devices and their respective states to monitor, provide rules for evaluating the state information to generate the presence information. The control system 42 is also associated with a network interface 52 for facilitating communications over the packet-switched network 22.

Figure 4:
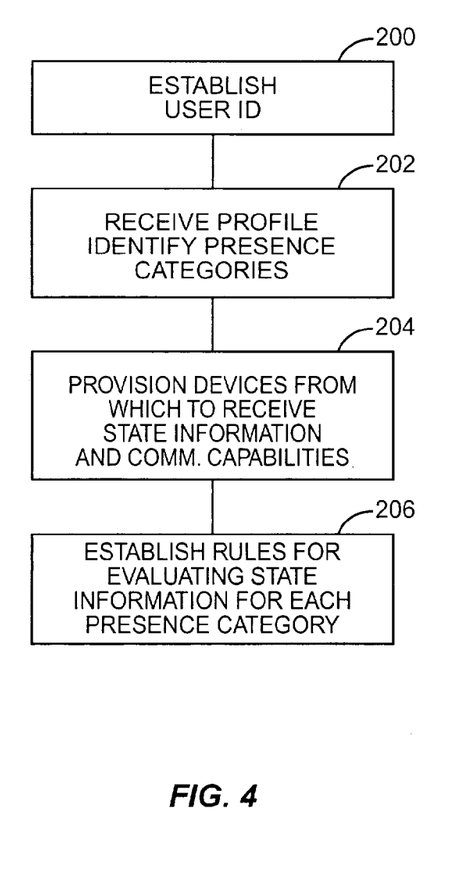
FIG. 4 is a flow diagram outlining a provisioning process according to one embodiment of the present invention.

An exemplary process for initializing the presence system 28 to disseminate user information is outlined in FIG. 4. Initially, the device must establish an identification for the presence system 28 (step 200). The presence system 28 will then receive a profile for the device (step 202). Based on the profile, the presence system 28 is provisioned to receive state information from the devices (step 204). Preferably, the device management logic 50 is configured to receive the state information from the provisioned devices. To configure the devices, users may have to interact directly with the devices themselves, or some server or switch that they are attached to, in order to configure the devices to start sending status information to a certain entity associated with the presence system 28 or directly to the presence system 28. Next, the rules for evaluating the state information are established based on the profile (step 206). At this point, the rules management logic 48 and device management logic 50 are configured for a given user.

Those skilled in the art will recognize limitless variations in profile and rule constructions for evaluating state information and generating presence information to send to subscribing queue management systems 12. Further, any combination of current and past device state information may be used to determine the presence information. Preferably, the presence information is automatically updated, if necessary, when state changes are detected. Depending on the presence rules, a state change from a given device may or may not impact the presence information. If the presence information does not change, then there may not be a need to update the queue management system 12.

Figure 5:
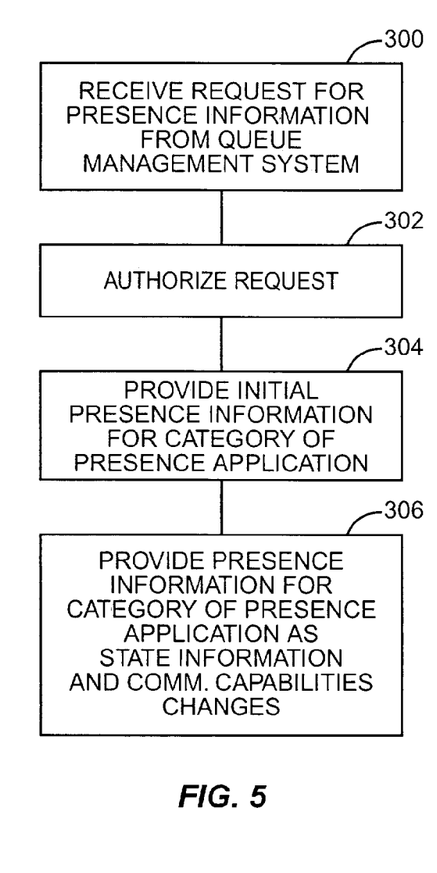
FIG. 5 is a flow diagram outlining overall operation of a presence system according to one embodiment of the present invention.

FIG. 5 provides an exemplary process for subscribing to presence updates for a user through the presence system 28. Initially, the queue management system 12 will send a request to subscribe to the presence system 28. The subscription management logic 46 of the presence system 28 will receive the request for presence information from the queue management system 12 (step 300). The presence system 28 will authorize the request (step 302), and, if authorized, provide initial presence information to the subscribing queue management system 12 (step 304). The initial presence information may be default presence information or that based on current states of the devices as evaluated by the rules. Once subscribed, the presence system 28 will provide presence information to the queue management system 12 as state information from the devices change in a manner warranting a presence update (step 306).

Figure 6:
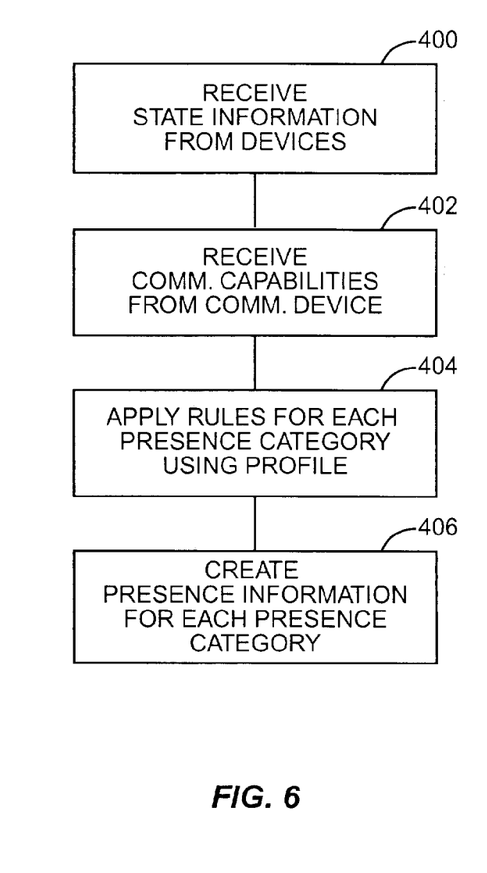
FIG. 6 is a flow diagram outlining the processing of state information according to one embodiment of the present invention.

FIG. 6 illustrates an exemplary process for evaluating state information from the provisioned devices. The process continuously receives state information and communication capabilities from the provisioned devices (steps 400 and 402) and applies the rules based on a profile (step 404). Notably, the queue management system 12 can be associated with a profile to configure or otherwise filter the types of presence information requested. Finally, the rules management logic 48 will evaluate the state changes and create presence information, if necessary, to send to the subscribing queue management system 12 (step 406).

Although many communication protocols may be used to facilitate communications, including delivery of state and presence information between the various devices, the Session Initiation Protocol (SIP) or the SIP for Instant Messaging and Presence Leveraging Extensions (SIMPLE) protocol is implemented in one embodiment of the present invention. The specification for SIP is provided in the Internet Engineering Task Force's RFC 2543: Session Initiation Protocol Internet Draft, which is incorporated herein by reference in its entirety.

In general, a SIP proxy, such as may be provided by the proxy server 28, may facilitate media sessions between any number of endpoints, which represent the devices communicating with each other. These endpoints may support any one or combination of data, audio, and voice media sessions, depending on the configuration of the respective endpoints. In addition to traditional SIP endpoints, endpoints for the present invention may take the form of the switch 24, the registrar 32, the presence system 28, and the device running the queue management system 12.

A SIP endpoint is generally capable of running an application, which is generally referred to as a user agent (UA), and is capable of facilitating media sessions using SIP. User agents register their ability to establish sessions with a SIP proxy, such as proxy server 28, by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network, by providing the Internet Protocol (IP) address and port that the user agent will use for SIP sessions. A "SUBSCRIBE" message may be used to subscribe to an application or service provided by a SIP endpoint. Further, "NOTIFY" messages may be used to provide information between SIP endpoints in response to various actions or messages, including REGISTER and SUBSCRIBE messages.

When a user agent wants to establish a session with another user agent, the user agent initiating the session will send an INVITE message to the SIP proxy and specify the targeted user agent in the TO header of the INVITE message. Identification of the user agent takes the form of a SIP URL. In its simplest form, the URL is represented by a number or "<username>@<domain>," such as "janedoe@nortelnetworks.com." The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

The following example illustrates detailed message flows related to telephony devices, which are in one particular class of devices that can provide state information. Other classes of devices, including but not limited to those previously discussed, may have their own unique message flows to achieve similar results. Those skilled in the art will recognize there are many implementation methods possible for associating devices with the presence system 28. This SIP-based example provides a relatively simple explanation of relevant message flows.

Figure 7:
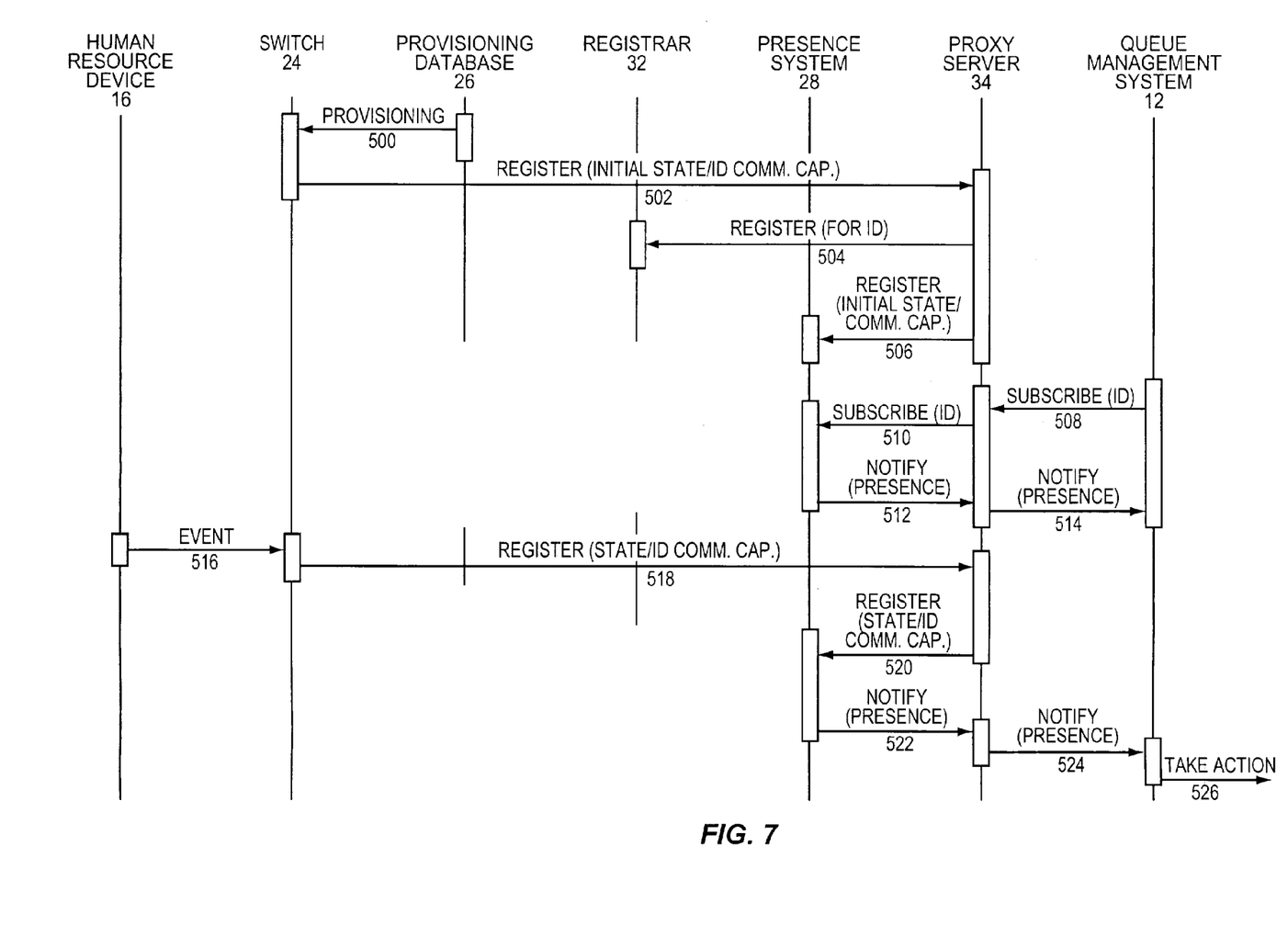
FIG. 7 is a communication flow outlining an exemplary process for automatically providing state information from a telephony system.

An exemplary message flow for providing state information relating to a human resource device 16, such as the landline telephone 16A or wireless telephone 16B on the circuit-switched network 20, is illustrated in FIG. 7. Although the SIP protocol is used for illustration, those skilled in the art will recognize the general functionality of the described messages and their applicability to other protocols. Further, the switch 24 is preferably configured to monitor states resulting from naturally occurring user interactions and provide corresponding state information to the presence system 28. For example, the natural interaction could be the user selecting a mode of operation, such as ring, meeting (off or vibrate), or actually participating in a call.

The flow begins when a user initially requests activation of the human resource device 16 through a local exchange carrier or like entity, which controls access and communications for the human resource device 16. Typically, the human resource device 16 is provisioned by providing provisioning information from the provisioning database 26 to the switch 24 (step 500). Accordingly, the switch 24 will receive the provisioning information from the provisioning database 26 and provision the human resource device 16, as well as store information that correlates the relationship between the human resource device 16 and a presence ID, which is used by the presence system 28 for determining the state of the human resource device 16. The human resource device 16 in this example is typically identified on the circuit-switched network 20 using a directory number, caller identification, or similar designation.

Once the provisioning of the human resource device 16 is complete, the switch 24 will send a REGISTER message to the proxy server 34 (step 502). Preferably, the switch 24 registers as a user agent, and the proxy server 34 acts as a SIP proxy server. The REGISTER message effectively registers the ability of the switch 24 to provide presence information with the proxy server 34. In particular, the REGISTER message informs the proxy server 34 of the SIP URL that identifies the user agent of the switch 24 to the (SIP) packet-switched network 22. The REGISTER message may also contain information about how to reach the user agent over the packet-switched network 22, typically by providing the Internet Protocol (IP) address and port that the user agent will use for SIP sessions. Preferably, the REGISTER message will also include an initial state of the human resource device 16 and identification indicia for the human resource device 16. The identification indicia in a SIP environment is preferably a SIP ID, which is the logical address associated with the human resource device 16 as represented on the packet-switched network 22.

In response to this initial REGISTER message, the proxy server 34 will send a like REGISTER message to the registrar 32 to register the human resource device 16 with the registrar 32 (step 504). Further, the proxy server 34 may also forward the REGISTER message to the presence system 28 (step 506). At this point, the presence system 28 has registered the human resource device 16 and has associated an initial state for the human resource device 16. All other auxiliary devices 30 used to determine presence information of the user will register in the same or similar fashion.

The presence system 28 consolidates and/or transforms device data into the state associated with a logical or user identification and provides relevant state information to the queue management system 12. Subsequently, the queue management system 12 will subscribe to the presence service provided by the presence system 28 to receive presence state information based on state changes associated with the various devices. Accordingly, the queue management system 12 will send a SUBSCRIBE message, which includes identification information (SIP ID) of the user or human resource device 16, to the proxy server 34 (step 508), which will forward the SUBSCRIBE message to the presence system 28 (step 510). In response, the presence system 28 will use the SIP ID provided in the SUBSCRIBE message to identify the devices for which presence information is requested. Once the presence system 28 has evaluated the state of the human resource device 16, a NOTIFY message, including presence information for the user of the telephony device 16, is sent to the proxy server 34 (step 512), which forwards the NOTIFY message to the queue management system 12 (step 514). At this point, the queue management system 12 has subscribed to the presence system 28 for the human resource device 16 and has received the initial presence information therefor, and perhaps the state of the human resource device 16 and other devices, if so provisioned. Thus, the queue management system 12 may react as necessary in response to receiving the presence information and awaits state change notifications.

Assume that the human resource device 16 changes state, such as being placed on hook, going off hook, initiating a hold function, going out of service, initiating a service activation, changing modes, or the like. In essence, any change of state caused by a transition will trigger an event, which is sent to the switch 24 in traditional fashion (step 516). In addition to normal processing of the event, the switch 24 will recognize that the human resource device 16 has been provisioned to alert the presence service of state changes, and will send a REGISTER message identifying the human resource device 16 (preferably using the SIP ID) and including the current state to the proxy server 34 (step 518), which represents the presence system 28 to the switch 24. The proxy server 34 will then send a REGISTER message to register the new state in association with the identified human resource device 16 with the presence system 28 (step 520). The presence system 28 will then process the state information to create the presence information and send a NOTIFY message, if necessary, to the proxy server 34 to provide the updated presence information (step 522). The proxy server 34 will forward the NOTIFY message, which includes the presence information, to the queue management system 12 (step 524), which can then take appropriate action based on the state information (step 526).

Those skilled in the art will recognize that the use of REGISTER messages is only one implementation. In general, the switch 24 or some other device that provides autonomous state change information can use a REGISTER message or some other undefined message to notify the presence service. If the presence system 28 subscribes to the information on the switch 24, which changes the role of the switch 24 to that of a presence user agent, it would allow the use of NOTIFY messages to communicate the presence data to the presence system 28.

The switch 24 may be configured to provide a table, which correlates the identification of the human resource device 16 on the circuit-switched network 20 with a presence identity, which is preferably a SIP address or URL. Using this table, the switch 24 can identify state changes for the human resource device 16, process the changes based on the rules management logic 48, and send updated state information indirectly or directly to the presence system 28. Part of the service subscription process will provision a presence address and correlate it with a registered mobile telephone 16B, based either upon the mobile identification number, a SIM card identification, the telephone number, or like designation.

Whenever the user's mobile telephone 16B is on and in reach of the mobile network, a home location register (HLR) is made aware of this fact as part of the normal course of cellular telephone operation. The HLR can register on-line status on behalf of the user's presence identification based on this information. As noted, the state information may include location identification in addition to traditional state information. Those skilled in the art will recognize the application of the present invention to both traditional time division multiplexing (TDM) switching systems and more recent innovations, such as IP public branch exchanges, or telephony clients, such as SIP user agents, H.323 endpoints, Microsoft NetMeeting, or real-time communication clients. Network resources, such as SIP proxies or H.323 gatekeepers, may also apply this technology if they retain call status information on the endpoints or user agents they manage.

Figure 8:
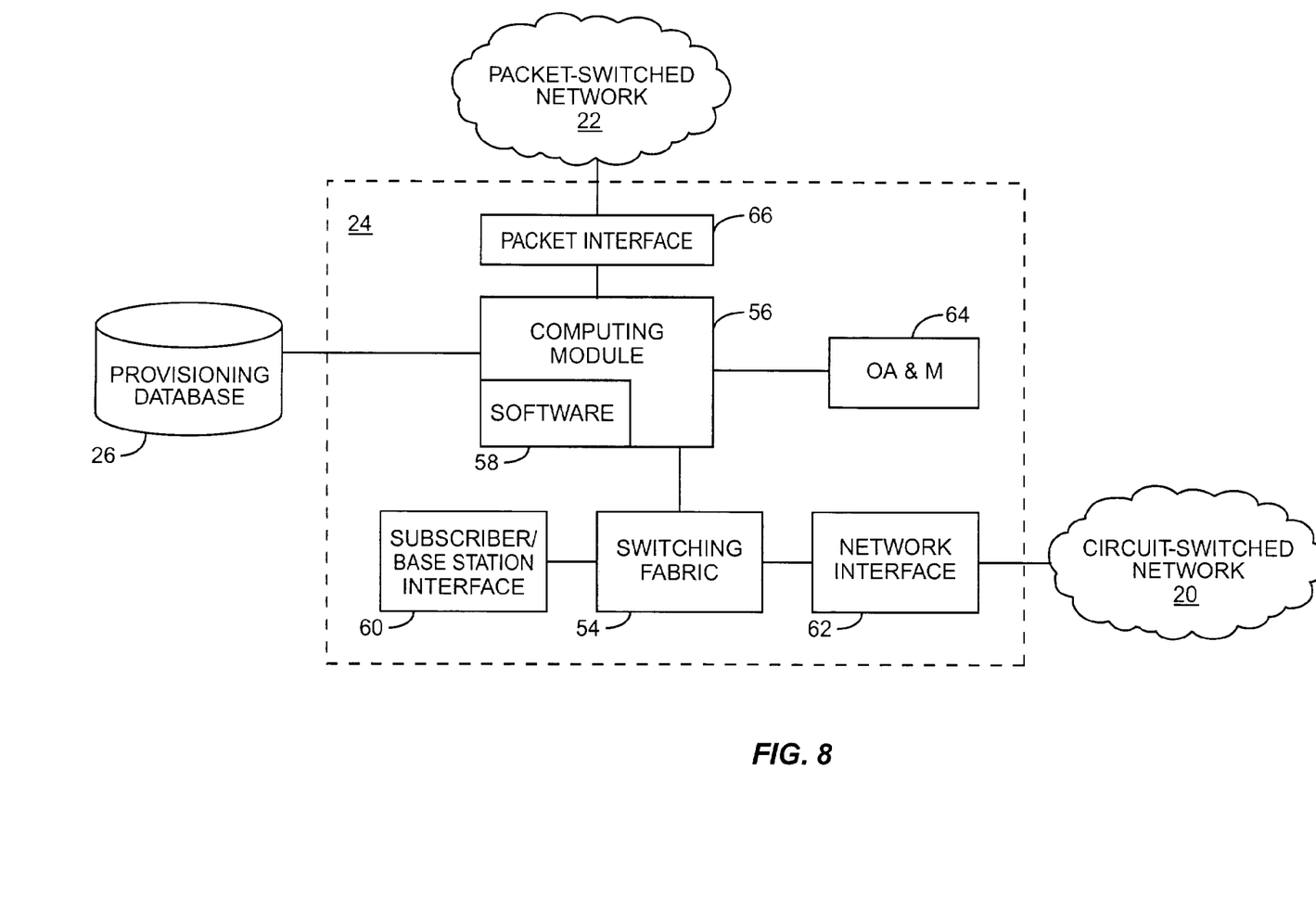
FIG. 8 is a block representation of a telephony switch constructed according to one embodiment of the present invention.

Turning now to FIG. 8, a block representation of a switch 24 is illustrated. The switch 24 is represented generically and is intended to cover the logical functionality of land-based and mobile switching systems, which include all control for call server-based functions. These switches may be implemented in a variety of ways using different equipment types, such as Nortel Networks Limited's DMS-100 local switching system. The switch 24 typically includes a switching fabric module 54, a computing module 56 including storage software 58, a subscriber/base station interface 60, a network interface 62, an operations/administration and maintenance (OA & M) module 64 and a packet interface 66. The switching fabric 54 may comprise logical and physical switches for interconnecting the subscriber/base station interface 60 with the remainder of the circuit-switched network 20 through the network interface 62. Depending on a land-based or wireless embodiment, the subscriber/base station interface 60 will either directly support subscribers through subscriber lines or will support base stations, which facilitate wireless communications with mobile devices. As illustrated, the computing module 56 controls circuit-switched communications via the switching fabric 54 and is capable of providing traditional intelligent network monitoring and functions. Further, the computing module 56 may cooperate with the provisioning database 26 as described above. As noted, the functionality of the switch 24 may be provided in various levels of integration.

In operation, the software 58 of the computing module 56 is modified to recognize state changes associated with supported human resource devices 16 and to provide the state information via the packet interface 66 either directly or indirectly to the presence system 28 on the packet-switched network 22. As noted, the messages sent to the presence system 28 will include identification of the associated human resource device 16, relative state information, and perhaps location information derived from a mobile telephone 16B or from elsewhere in the system. Preferably, the computing module 56 will cooperate with the provisioning database 26 to store information indicating that the particular human resource device 16 is subscribing to the presence service and providing an address for sending state change messages directly or indirectly to the presence system 28. The other devices providing state information are similarly configured to trigger delivery of state information upon recognizing the occurrence of an event caused by the natural interaction with the device.

Current presence technology standards and systems are provided for in references from the Internet Engineering Task Force (IETF). Presence technology protocol-related publications hereby incorporated by reference include: Day, M., Aggarwal, S. and Vincent, J., "Instant Messaging/Presence Protocol Requirements," Request for Comment (RFC) 2779, February 2000; Day, M., Rosenberg, J. and Sugano, H., "A Model for Presence and Instant Messaging," RFC 2778, February 2000; Rosenberg, J. and Schulzrinne, H., "SIP caller preferences and callee capabilities," (work in progress), November 2000; Crocker, D. et al., "A Common Profile for Instant Messaging (CPIM)," (work in progress), February 2001.

Those skilled in the art will recognize improvements and modifications to the preferred embodiments of the present invention. All such improvements and modifications are considered within the scope of the concepts disclosed herein and the claims that follow.

What is claimed is:

1. A method for handling resources comprising:
    defining a plurality of skill sets for a queue management system;
    registering individual resources of a plurality of resources for one or more of the plurality of skill sets;
    subscribing the queue management system to a presence system to receive presence information;
    receiving a request at the queue management system for provision of a response to an inquiry related to one of the plurality of skill sets;
    determining whether any of the resources are registered for the one of the plurality of skill sets;
    placing the request into a queue associated with the one of the plurality of skill sets;
    receiving presence information, at the queue management system, from the presence system; and
    removing the request from the queue and assigning the request to a resource based on the presence information received from the presence system.

2. The method of claim 1 wherein registering individual resources of the plurality of resources comprises registering resources selected from a group consisting of: human resources and automated resources.

3. The method of claim 1 wherein registering individual resources of the plurality of resources comprises registering information selected from a group consisting of: experience and authority level.

4. The method of claim 1 further comprising associating one or more of a plurality of communication technologies with one of the plurality of resources.

5. The method of claim 4 wherein assigning the request to the resource comprises effecting a connection between a requestor and the resource through the one or more of the plurality of communication technologies.

6. The method of claim 1 wherein assigning the request to the resource is based in part on a length of time a state has been maintained for the resource.

7. The method of claim 1 wherein assigning the request to the resource is based in part on recent activity of the resource.

8. The method of claim 1 further comprising generating presence information for the presence system.

9. The method of claim 8 wherein generating presence information comprises generating state information for a given resource.

10. The method of claim 1, wherein the step of registering individual resources of the plurality of resources for one or more of the plurality of skill sets further comprises registering respective identities of the individual resources, registering specific roles in which the individual resources can provide resources, and registering media capabilities of the individual resources.

11. The method of claim 10, wherein the request is assigned to a resource based on the availability of the resource to provide a specific role and the media capabilities of the resource for the specific role at a given time.

12. The method of claim 11, wherein each of the individual resources provide multiple roles at different times.

13. The method of claim 1, wherein the individual resources are dispersed over a plurality of disparate networks.

14. A queue management system comprising:
    an interface; and
    a control system associated with the interface and adapted to:
        define a plurality of skill sets for the queue management system;
        register individual resources of a plurality of resources for one or more of the plurality of skill sets;
        subscribe the queue management system to a presence system to receive presence information;

receive a request at the queue management system for provision of a response to an inquiry related to one of the plurality of skill sets;

determine whether any resources are registered for the one of the plurality of skill sets;

place the request into a queue associated with the one of the plurality of skill sets;

receive presence information, at the queue management system, from the presence system; and remove the request from the queue and assign the request to a resource based on the presence information received from the presence system.

15. The queue management system of claim 14 wherein the control system adapted to register individual resources registers resources selected from a group consisting of: human resources and automated resources.

16. The queue management system of claim 14 wherein the control system adapted to register individual resources registers information selected from a group consisting of: experience and authority level.

17. The queue management system of claim 14 wherein the control system is further adapted to associate one of a plurality of communication technologies with one of the plurality of resources.

18. The queue management system of claim 17 wherein the control system adapted to assign the request to the resource effects a connection between a requestor and the resource through the one of the plurality of communication technologies.

19. The queue management system of claim 14 wherein the control system adapted to assign the request to the resource does so based in part on a length of time the resource has been in a given state.

20. The queue management system of claim 14 wherein the control system adapted to assign the request to the resource does so based in part on recent activity of the resource.

21. The queue management system of claim 14 further comprising the presence system and wherein the presence system receives presence information relating to availability of the resource.

22. The queue management system of claim 21 wherein the presence system receives state information for the resource to receive the presence information.

* * * * *